(12) United States Patent
Wu et al.

(10) Patent No.: US 8,645,358 B2
(45) Date of Patent: Feb. 4, 2014

(54) SYSTEMS AND METHODS FOR PERSONALIZED SEARCH SOURCING

(75) Inventors: Su-Lin Wu, San Carlos, CA (US); Liang-Yu (Tom) Chi, San Francisco, CA (US); Vik Singh, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 468 days.

(21) Appl. No.: 12/768,860

(22) Filed: Apr. 28, 2010

(65) Prior Publication Data

US 2011/0072010 A1 Mar. 24, 2011

Related U.S. Application Data

(63) Continuation-in-part of application No. 12/563,150, filed on Sep. 20, 2009.

(51) Int. Cl.
*G06F 7/00* (2006.01)

(52) U.S. Cl.
USPC ........ 707/722; 707/769; 707/783; 705/14.54; 705/319

(58) Field of Classification Search
USPC ........ 707/999.003, 722, 769, 783; 705/14.54, 705/319
See application file for complete search history.

(56) References Cited

U.S. PATENT DOCUMENTS

| | | | |
|---|---|---|---|
| 2002/0038299 | A1 | 3/2002 | Zernik |
| 2005/0033657 | A1* | 2/2005 | Herrington et al. ............. 705/26 |
| 2006/0026556 | A1* | 2/2006 | Nishimura .................... 717/104 |
| 2006/0282304 | A1* | 12/2006 | Bedard et al. ................... 705/10 |
| 2007/0255702 | A1* | 11/2007 | Orme ............................... 707/5 |
| 2008/0097822 | A1* | 4/2008 | Schigel et al. .................. 705/10 |
| 2009/0287684 | A1* | 11/2009 | Bennett ............................ 707/5 |

OTHER PUBLICATIONS

Taiwanese Office Action corresponding to Taiwanese Serial No. 099131556 dated Jun. 14, 2013.

* cited by examiner

*Primary Examiner* — Hosain Alam
*Assistant Examiner* — Jieying Tang
(74) *Attorney, Agent, or Firm* — Pillsbury Winthrop Shaw Pittman LLP

(57) ABSTRACT

The present invention provides a method and system for customized search results in an advanced search results page including vertical searching pivot points for personalizing and refining searching operations. The method includes tracking user network activities and receiving a search query from the user, the search query including a plurality of search terms. The method and system includes identifying a plurality of preferred content sources based on the tracked network activities and retrieving content items in response to the search query. The method and system filters the content items based on the preferred content sources and therein generates a search result page displaying at least a portion of the filtered content items and at least one of the preferred content sources, wherein the display of the at least one preferred content source allows the user to pivot the search results portion based solely on the preferred content source.

20 Claims, 7 Drawing Sheets

SYSTEMS AND METHODS FOR PERSONALIZED SEARCH SOURCING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

The present application is a Continuation-in-part of, and hereby claims priority to, U.S. patent application Ser. No. 12/563,150, filed Sep. 20, 2009, entitled "Systems and Methods For Providing Advanced Search Result Page Content."

FIELD OF THE INVENTION

Embodiments of the invention described herein generally relate to providing advanced content located on a search results page ("SRP"). More specifically, the embodiments of the present invention are directed towards systems and methods for providing personalized search sourcing within an advanced search result page.

BACKGROUND OF THE INVENTION

As the Internet continues to exponentially expand, the role of search engines has dramatically increased. The sheer volume of data has quickly become impossible for a human user to manipulate on his or her own. Thus, the use of search engine technology has become a vital tool in the useful operation of the Internet.

Great strides have been made in optimizing search engines with respect to the quality of results returned in response to a query. Currently existing algorithms allow users to usually identify relevant websites within seconds of submitting a query. However, despite these advances very little advances have been made with respect to analyzing specific or aggregate user behavior and providing easily accessible data to the user directly on the SRP.

Moreover, many existing search operations are performed on general document corpus with back-end processing document filtering. One technique is filtering received results based on profile characteristics of a user. The back-end processing of filtering results does not account for the user's own preference, but rather is dictated by the back-end processing algorithms. Therefore, in addition to advance search result processing, there is a need for personalization of search sources.

SUMMARY OF THE INVENTION

The present invention provides a method and system for customized search results in an advanced search results page including vertical searching pivot points for personalizing and refining searching operations. The method includes tracking user network activities and receiving a search query from the user, the search query including a plurality of search terms. The method and system includes identifying a plurality of preferred content sources based on the tracked network activities and retrieving content items in response to the search query. The method and system filters the content items based on the preferred content sources and therein generates a search result page displaying at least a portion of the filtered content items and at least one of the preferred content sources, wherein the display of the at least one preferred content source allows the user to pivot the search results portion based solely on the preferred content source.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
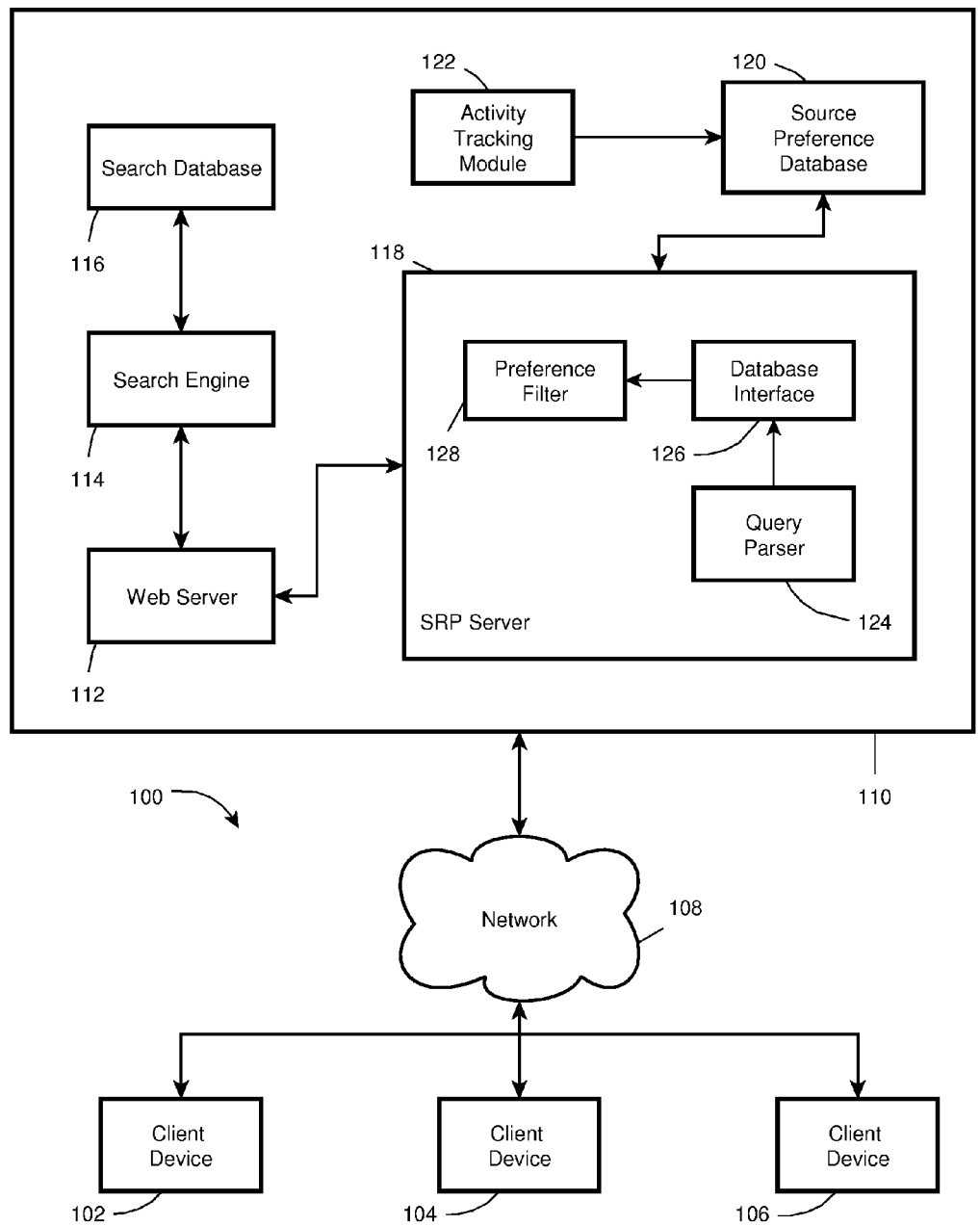
FIG. 1 illustrates a block diagram of one embodiment of a system for customized search results.

FIG. 1 presents a block diagram depicting a system for providing personalized source searching according to one embodiment. As the embodiment of FIG. 1 illustrates, a plurality of client devices 102, 104 and 106 are connected to a search provider 110 via a network 108. The search provider 110 includes a web server 112, search engine 114, search database 116, a search result page (SRP) server 118, an activity tracking module 122, and a source preference database 122. SRP application server 118 includes query parser 124, database interface 126 and preference filter 128.

Client devices 102, 104 and 106 may be general purpose computing devices (e.g., personal computers, television set top boxes, mobile devices, etc.) having a central processing unit, memory unit, permanent storage, audio/video output devices, network interfaces, etc. Client devices 102, 104 and 106 are operative to communicate via network 108, which may be a local or wide area network such as the Internet. In the present embodiment, client devices 102, 104 and 106 transmit requests to content provider 110 via the HTTP, WAP or similar protocol for the client/server exchange of text, images and other data.

Client devices 102, 104 and 106 are operative to transmit requests for search results to search provider 110, the search requests including search terms. The terms may be user generated search terms or can be user-assisted, i.e. suggested, search terms. In one embodiment, client devices 102, 104 and 106 may be operative to transmit an HTTP request containing a textual query string. For example, a user operating a client device 102, 104 and 106 may enter a query string with search terms such as "sushi in new york, ny" and submit the query via an HTML form element.

Search provider 110 receives queries from the client devices via web server 112. In one embodiment, web server 112 may comprise various hardware components running web server software such as APACHE HTTP SERVER, MICROSOFT IIS, or any other suitable web server software.

Web server 112 extracts the query string and generates a search engine request to be transmitted to search engine 114. Search engine 114 may comprise various hardware and software components operative to receive requests for search results, optimize search algorithms and extract data from the search database 116. Various search engine techniques that may be employed are well known in the art and are not discussed herein for brevity's sake.

Search engine 114 retrieves a plurality of search results from the search database 116. In one embodiment, search database 116 may comprise a plurality of indices allowing access to stored resource identifiers associated with a given query. After retrieving a plurality of search results, search engine 114 transmits the results back to web server 112.

In addition to retrieving a plurality of search results, web server 112 is further operative to transmit the received query to SRP server 118. In FIG. 1, the search processing modules and the SRP server 118 are illustrated in the same search provider 110, but it is recognized by one skilled in the art that the elements may also be disposed in a distributed processing environment.

In addition the web server 112, the activity tracking module 122 monitors user activities via the client devices 102, 104 and/or 106. In one embodiment, users are registered or logged into the web server 112, thereby user activities can be tracked based on profile information. It is recognized that other systems may be used to track activity, such as looking at IP address, cookies, or any other suitable user-recognition technique. As described in further detail below, such as with respect to FIG. 3, the activity tracking module tracks user activities and logs preferred locations in the source preference database. As used herein, locations refers to web locations having accessible content, such as but not limited to general web domains, e.g. a specific uniform resource locator, a suite of web domains, e.g. wiki-based domains, a type of web domains, e.g. social or network web domains, or any other suitable electronically accessible network location.

When the SRP server 118 receives a query from web server 112, query parser 124 may break down the preprocessed query into discrete keyword components and transmit the keyword components to database interface 126. It is recognized additional processing may be performed prior to the query parser 124.

In the illustrated embodiment, database interface 126 accesses the source preference database 120 to determine which, if any, preferred content sources are of particular relevance to the search-requesting-user. Based on these content preferences, the preference filter 128 is therein operative to filter the search results from the web server. In addition to filtering the search results based in part on the preferred sources from the source preference database 120, the SRP server is further operative to update the SRP to include one or more of the preferred content sources as a search pivot point.

The SRP server 118 therein provides the SRP to the server 112. In response, web server 112 may perform additional processing, such as applying advertising or additional content. The web server 112 may thereupon transmit the generated SRP to the client device 102 in response to the search request. The SRP includes the filtered content based on the source preferences determined based on tracking user activities, as well as including one or more of the preferences as a pivot point for further refining of the search results, as described in further detail below.

Figure 2:
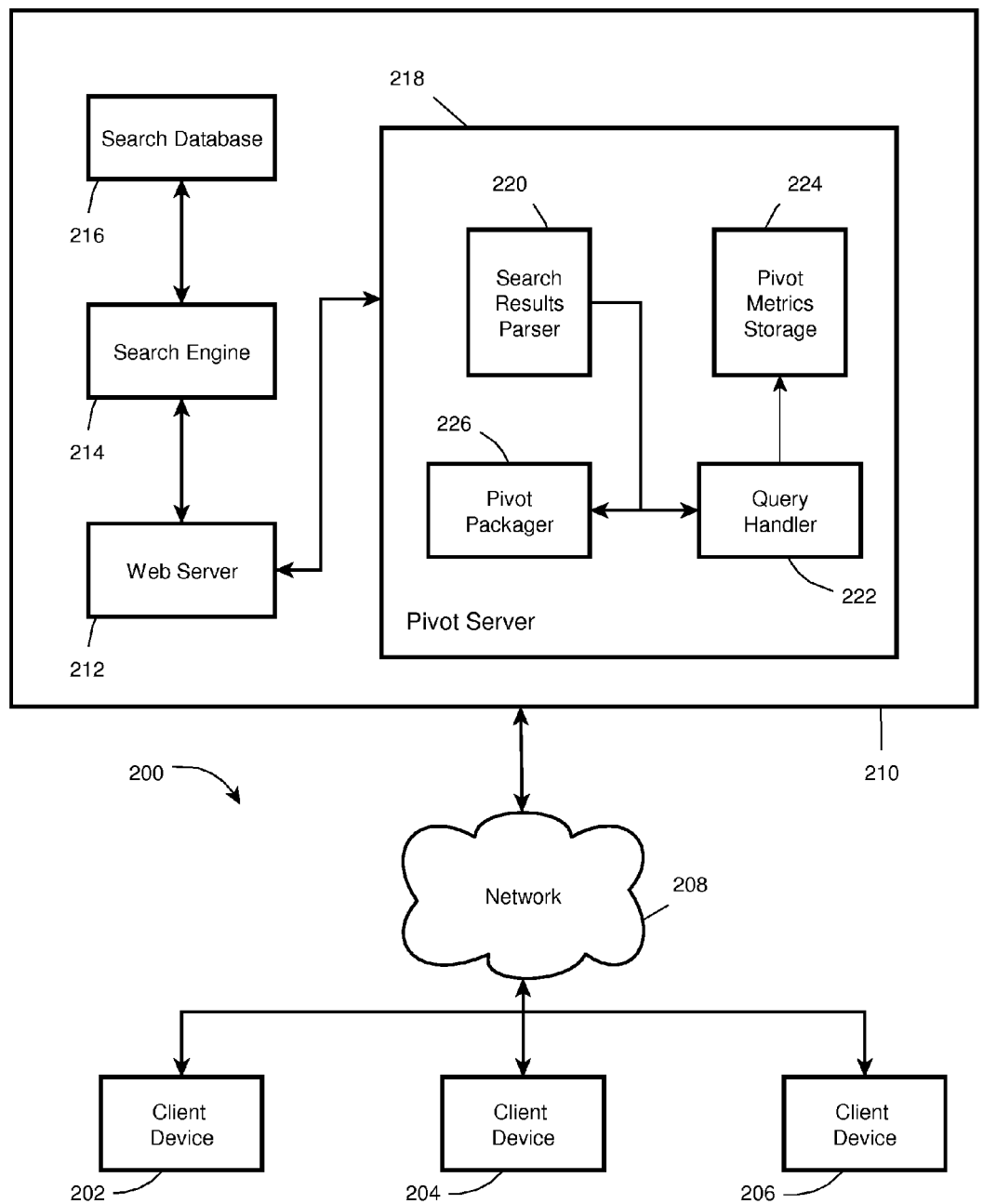
FIG. 2 illustrates a block diagram on another embodiment of a system for customized search results.

FIG. 2 presents a block diagram depicting a system for providing query-based pivot data points according to one embodiment of the present invention. As the embodiment of FIG. 2 illustrates, a plurality of client devices 202, 204 and 206 are connected to a search provider 210 via a network 208. According to the embodiment of FIG. 2, the search provider 210 comprises a web server 212, search engine 214, search database 216 and pivot server 218. Pivot server 218 comprises a search results parser 220, query handler 222, pivot metrics storage 224 and pivot packager 226.

In general, the operation of client devices 202, 204 and 206 with respect to requesting search results from web server 212, search engine 214 and search database 216 are substantially similar in operation with respect to elements 102, 104, 106, 112, 114 and 116 and will not be repeated for brevity.

In the embodiment of FIG. 2, web server 212 may further be operative to transmit the retrieved search results to the pivot server 218. In the illustrated embodiment, search results may be received by the search results parser 220. Search results parser 220 performs parsing operations on the received search results, such as grouping search results by domain or other pivot point. Search results parser 220 then transmits the parsed results to query handler 222.

In one embodiment query handler 222 receives the submitted query from web server 212 along with the parsed search results. Query handler 222 may be operative to extract a plurality of pivot metrics from pivot metrics storage 224 based on the parsed search results and generate a plurality of pivot data points. For example, pivot metrics storage 224 may contain domain-specific attributes that are to be applied to a given pivot data point (e.g., domain-specific search query parameters). In this embodiment, the pivot metrics include the preferred content source.

Additionally, query handler 222 may be operative to analyze the given query to further refine the pivot data points selected. For example, query handler 222 may be operative to categorize the type of query as one directed towards shopping, travel, people, etc. This categorization may be used to narrow the list of pivot data points. For example, a search related to shopping may allow query handler 222 to ignore results from a social networking site when identifying domain-specific pivot data points.

After retrieving a plurality of pivot data points, query handler 222 may transmit the pivot data points to pivot packager 226. As used herein, the pivot data points are data points to refine the search based on the specific data, such as the example being refining to a specific web location, which is exemplary and not a limiting example. In one embodiment, pivot packager 226 may be responsible for preparing the pivot data point for insertion into an SRP. For example, pivot packager 226 may be operative to construct a representation of the pivot data point including images, JavaScript and active data links (e.g., HTML hyperlinks) associated with the data pivot point, wherein the pivot data point may be a preferred content source.

Pivot packager 226 is further operative to transmit the packaged pivot package(s) back to web server 212. In response, web server 212 may combine the pivot package(s) with the previously received search results. In one embodiment, combining pivot package(s) with search results may comprise identifying sections of a predefined SRP template and placing the search results and pivot package(s) in the respective template locations. Exemplary embodiments of an SRP are further discussed with respect to FIG. 5-6, as well as the flowchart of FIG. 4a-4b.

Figure 3:
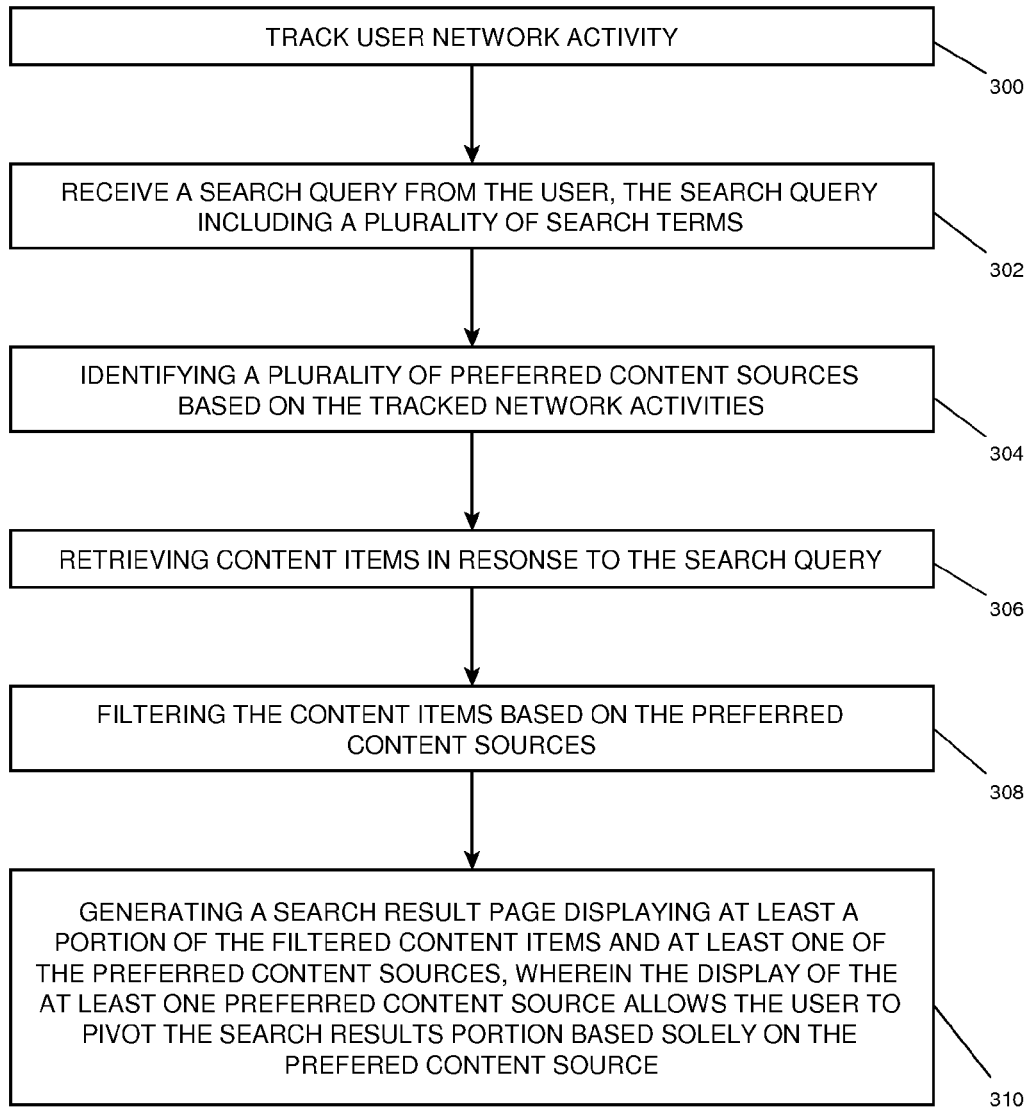
FIG. 3 illustrates a flowchart of the steps of one embodiment of a method for customized search results according to one embodiment of the present invention.

FIG. 3 illustrates a flowchart of the steps of one embodiment of a method for customized search results with an advanced search results page. The method begins, step 300, by tracking user network activity. This step may include recognizing a user logged into an interface or other suitable means for determining the identity of a user. The tracking may include actively monitoring or intermittently reviewing user web activities, such as a search history log, a user click history, a bookmark database, a web browser application toolbar, profile information, social network history information or any other suitable source recognized by one skilled in the art. In another embodiment, the tracking may include receiving and processing explicit user instructions for preferred content sources, such as a user indicating a preference for various sources over another.

In the method of FIG. 3, step 302 is receiving a search query from the user, the search query including a plurality of search terms. This search request may be received via a standard search interface or any other suitable means.

In step 304, the method includes identifying a plurality of preferred content sources based on the tracked network activities. Mining the network activity, such as, by way of example, identifies the user's most-frequented web locations, may be used to perform this identification. Other techniques may be utilized using the tracked network activities, such as the user's activities associated with a content-type and associating network activity with the content type. For example, if the user frequents a social-media web location and the network activity indicates activities relating to pop culture or news events, the context may be different from when the user visits technical sites or wiki-based sites for technological research.

In step 306, the method includes retrieving content items in response to the search query. This step may be performed in accordance with known search retrieval operations, including as described above with respect to FIGS. 1 and 2. The method step may include the active determination of the pivot points as described in FIG. 2.

Step 308 includes filtering the content items based on the preferred content sources. Filtering may include placing content items having a direct relation to the preferred content sources at higher search result locations.

Thereupon, in one embodiment, the method concludes with step 310, generating a search result page displaying at least a portion of the filtered content items and at least one of the preferred content sources, where the display of the at least one preferred content source allows the user to pivot the search results portion based solely on the preferred content source. This advanced search results display includes preferred content sources as pivot points, as described relative to FIG. 2 and described in further detail below. As such, through the method of FIG. 3, the user is presented with an advanced search result including filtered search results and pivot points based on preferred content sources.

In a further embodiment, not expressly illustrated in the flowchart steps of FIG. 3, the method and system further accounts for non-public content sources. As used herein, non-public content sources are source locations that are not readily publicly accessible, such as requiring membership or protected access. By way of example, a non-public content source may be an online discussion group or forum where users exchange ideas or conduct online discussions of various topics. For example, an answer forum may be an example where users post questions to the forum and various users can provide answers to the specific questions. Other examples may be forums dedicated to specific topics or proprietary databases where access is restricted based on subscription requirements. For example, a legal authority database may restrict general search engine access, but could contribute valuable search results if given access.

In the event of non-public content sources, the method includes identification of the non-public content sources to which the user has access. This may be based on the user click history, a cookie or other data structure or any other suitable type of account access database or data structure, such as for example an electronic key chain. Upon the identification, the method includes performing the search operation on the non-public content source. This may be done using standard searching operations or based on the nature of the content of the non-public content source, may include an interfacing module for the search engine to effectively communicate with the non-public content source. For example, if the non-public content source has a proprietary or a restricted searching function, the search operations may need to be translated or modified to access the non-public content source.

In addition to the search operations, the search engine may access user credentials for verification of access privilege to the non-public content source. This may include finding the user access credentials and supplying them to the non-public content source to verify and allow access to this content source.

In another embodiment, the user may restrict or otherwise control access to non-public content sources. For example, the user may prefer to place a higher preference on a non-public content source in a search result or may prefer to only utilize a particular feature or segment of the non-public content source, e.g. if the non-public content source is a large database with many categories, the user may prefer to not search all the categories, but rather limit searching to specific categories. Therefore one embodiment may include receiving user-access instructions for accessing the non-public content source and instructions for utilizing the content from the non-public content source in the search results page.

Thereupon, when the search and possible translations, if needed, are performed, the method therein includes the non-public content source in the plurality of preferred content sources and includes the non-public content in the search results. This may include the active display of the non-public content source in the search result as a pivot data point as described herein.

Figure 4A:
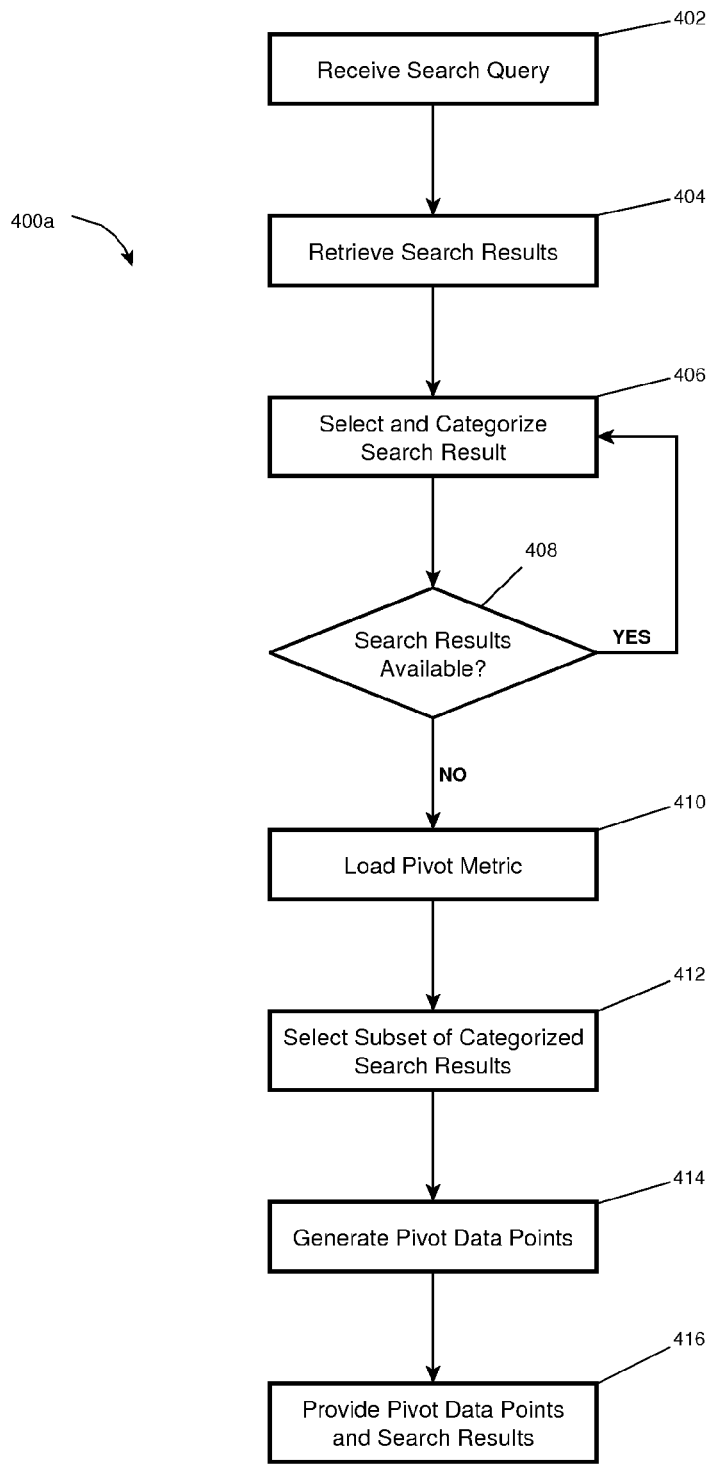
FIGS. 4a and 4b illustrates a flowchart of one embodiment of a method for customized search results including pivot data points including preferred content sources.

FIG. 4a presents a flow diagram illustrating a method for providing pivot data points associated with a search result set according to one embodiment of the present invention. It is noted that the method of FIGS. 4a and 4b may be executed within the system 200 of FIG. 2. According to the embodiment FIG. 4a illustrates, the method 400a receives a search query, step 402. In the illustrated embodiment, the method 400a may receive a search query via an HTTP request from an end user utilizing a search portal as known in the art. The method 400a subsequently retrieves search results associated with the query, step 404. Search result retrieval techniques are commonly known in the art and are not reiterated for the sake of brevity.

The method 400a selects a given search result and categorizes the result, step 406. The method 400a categorizes the search results until it generates a requisite number of search result listings, step 408. In one embodiment, the method 400a may categorize all search results. In alternative embodiments, the method 400a may limit the number of categorized search results based on a pre-determined threshold quantity.

In one embodiment, categorizing a search result may comprise determining the domain name of a search result. For example, the method 400a may determine the number of search results belonging to "example.com" and may store this categorical data locally. In alternative embodiments, the method 400a may categorize the results according to any predetermined categorization schemes including a preferred content source as described above.

After categorization, the method 400a loads pivot metrics, step 410. In one embodiment, pivot metrics may comprise any metadata associated with a given category. For example, pivot metrics may constrain the application of categories based on the number of results matched. That is, a given category will only be applied if the number of matched results exceeds a predetermined threshold. Alternatively, pivot metrics may comprise any metadata associated with a given category or domain.

The method 400a then selects a subset of the categorized search results, step 412. Selecting a subset of categorized search results may comprise extract the top N categories, as defined by a predetermined threshold. For example, the method 400a may determine that only the top three categories should be utilized or preferred content sources.

The method 400a generates pivot data points based on the categorized search results, step 414. In one embodiment, generating a pivot data point may comprise generating a self-contained object that can be placed within an SRP. For example, the method 400a may utilize pivot metric data and may generate or identify an image associated with the category, an HTML active data link associated with the pivot point and associated executable code such as JavaScript that is associated with the pivot data point. The method 400a may combine these and various other forms of data to generate the self-contained pivot data point. Herein, an active link may be generated based on the pivot data point, e.g. the point may be the content specifying the web location, e.g. "www.example.com" and the active link is the visual representation or manifestation of that pivot point, the active link being encoded into the SRP and the interface element which the user may select.

Finally, the method 400a provides the pivot data points and search results to a user in the SRP, step 416. In one embodiment, the method 400a embeds the previous generated pivot data point code within an SRP or SRP template, for example in a left-hand side bar, as noted in FIGS. 5-6 below.

Figure 4B:
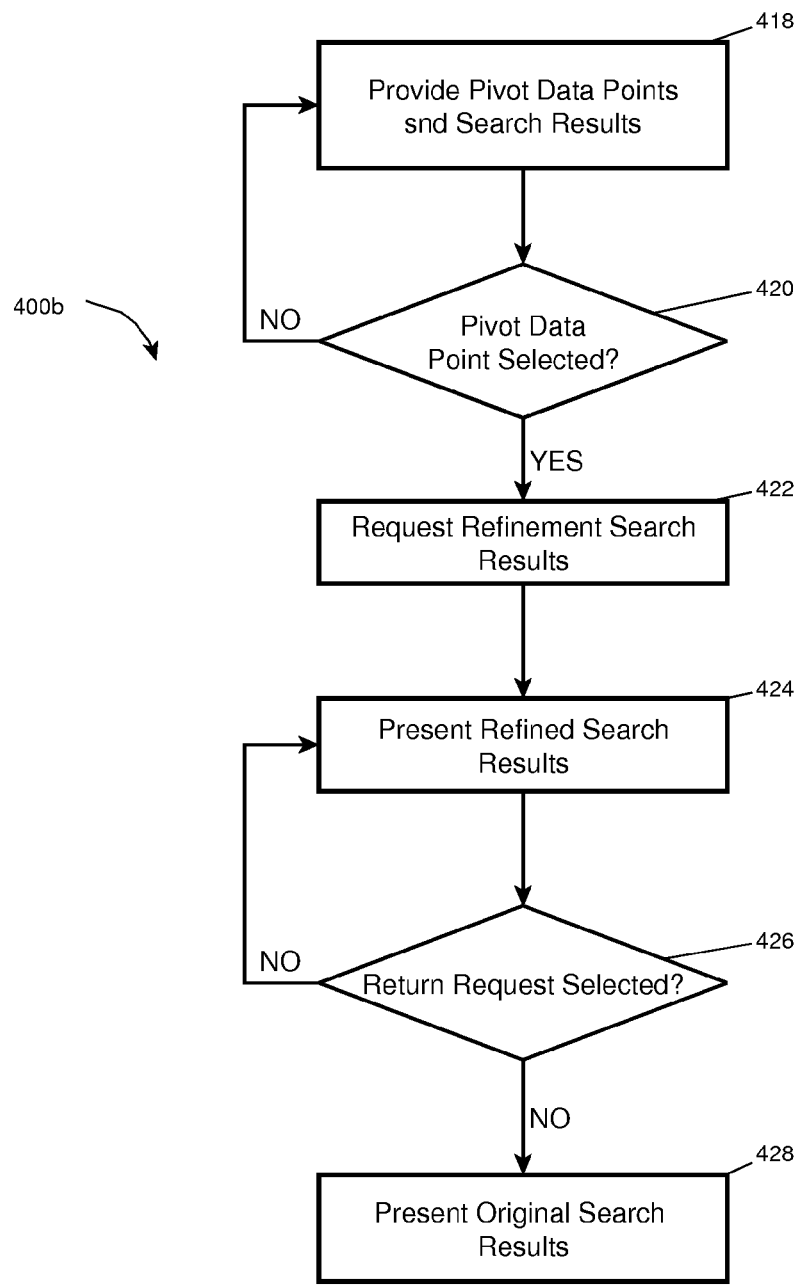

FIG. 4b presents a flow diagram illustrating a method for retrieving search results associated with a pivot data point according to one embodiment of the present invention. According to the embodiment FIG. 4b illustrates, the method 400b provides pivots points and search results as previously discussed, step 418. The method 400b then monitors a SRP to detect user selection of one of the pivot data points, step 420. Selecting a pivot data point may comprise clicking on the object with a mouse, entering a keystroke, or any user input action known in the art. In one embodiment, monitoring user interaction may be accomplished via client-side executable code such as JavaScript, Flash, or similar client side techniques.

If the user does not select a pivot data point, the method 400b continues to provide the pivot data points, step 418. If the user selects a pivot data point, the method requests refinement search results, step 420. In one embodiment, requesting refinement search results may comprise executing a second search query identified by the active data link within the pivot data point. In one embodiment, the second search query may be performed synchronously, that is, reloading a second, distinct SRP. In alternative embodiment the second search query may be executed asynchronous, that is, simply reloading the search results without reloading the SRP.

The method 400b then presents the refined search results, step 424. As previously discussed, presenting the refined search results may comprising displaying a second SRP similar to the first SRP. In one embodiment, the second SRP may comprise additional elements indicating that the second SRP is a refinement of the first based on the pivot data point, where this pivot data point is one of the preferred content sources. For example, the second SRP may state that the search results are refined and may provide an option to return to the first SRP. In one embodiment, this may be a toggle selection to revert back to the original SRP.

The method 400b continues to display the refined SRP until the detection of a return request is detected, step 426. If the method 400b detects that a user submitted a return request, the method presented the original SRP, step 428. As previously discussed, the method 400b may present the original SRP via a synchronous or asynchronous request. It is also noted that the user may toggle between different pivot data point SRPs by selection different active data links while viewing a refined SRP.

Figure 5:
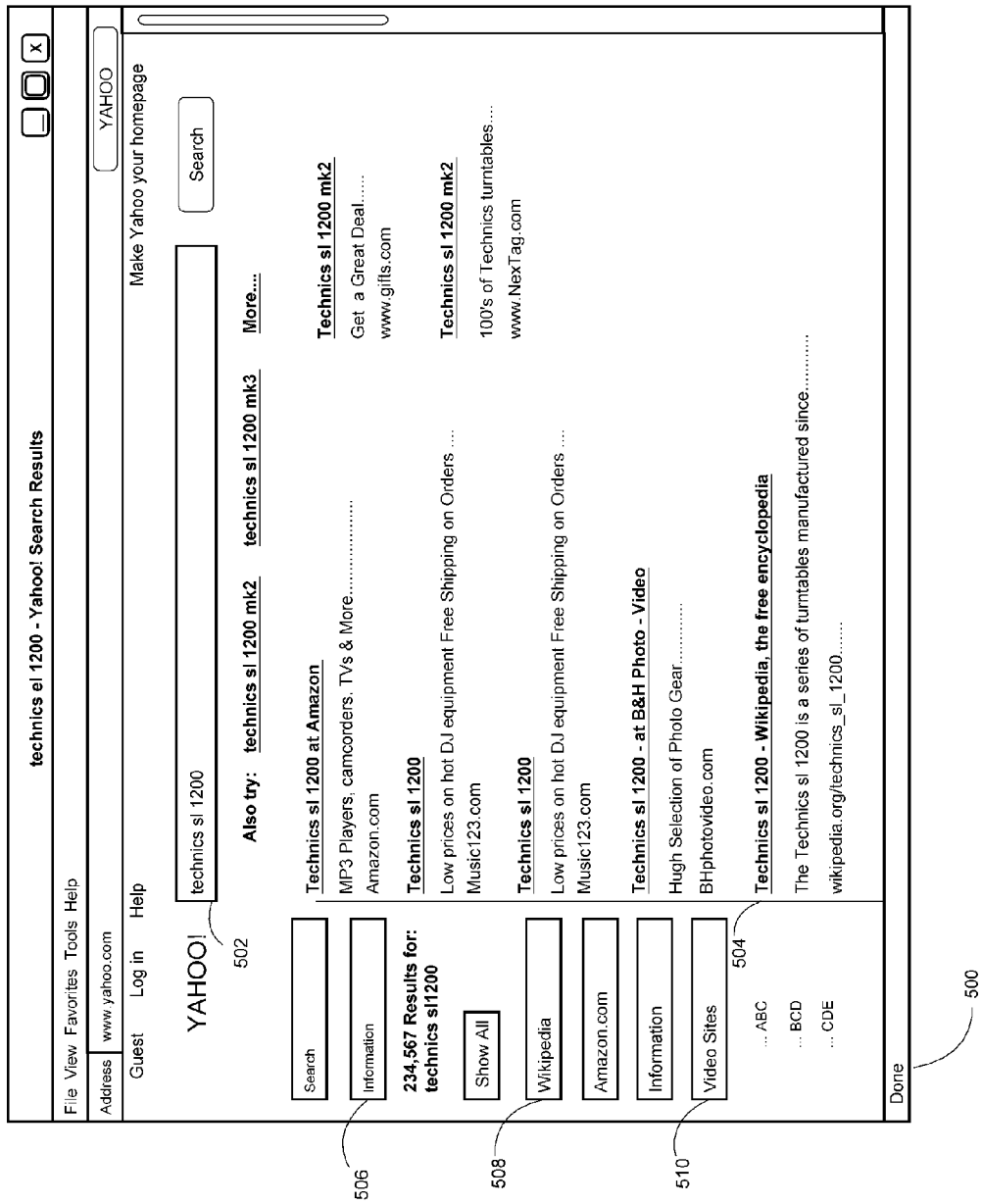
FIG. 5 illustrates a sample screenshot of a search results page including customized search results.

FIG. 5 presents a screen diagram illustrating a search results page according to one embodiment of the present invention. A general SRP 500 may be presented to the user comprising a plurality of components 502, 504, 506 and 508. As illustrated, the SRP comprises a text field 502 indicating the query the user has entered and a plurality of search results 504.

In addition to the search results 504, the SRP 500 also presents a sidebar 506 comprises various data objects including a plurality of pivot data points visible in the output display via the active data links 508 and a plurality of semantic object filters visible in the output display via the active data links 510. Pivot data points 508, which may be preferred content sources, may comprise HTML, image and JavaScript components as previous discussed. Furthermore, pivot data points 508 may be selected by the user, as will be presented with respect to FIG. 6.

Figure 6:
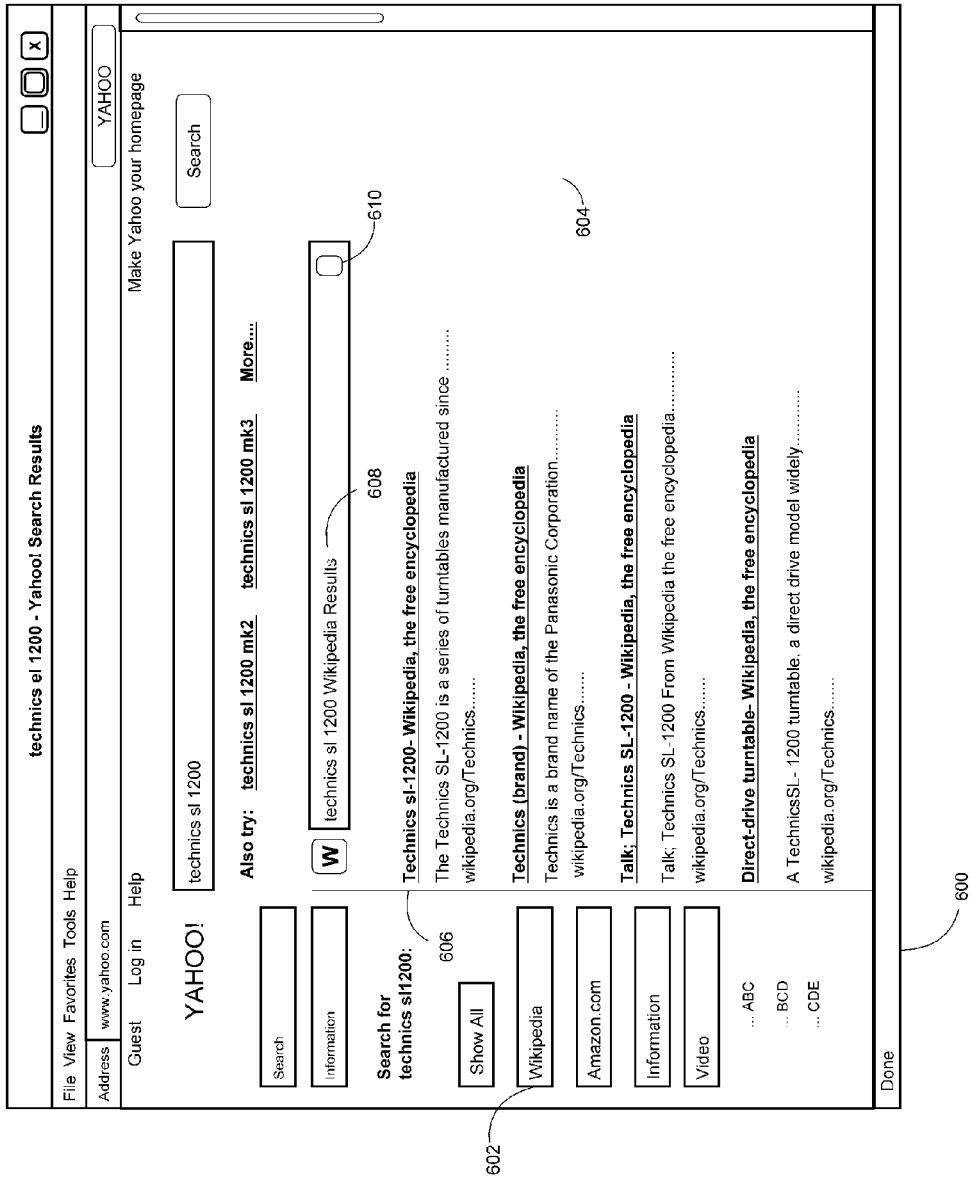
FIG. 6 illustrates a sample screenshot of search results pages including customized search results and a vertical pivot based on a selected preferred content source.

FIG. 6 presents a sample screenshot of a plurality of search results retrieved in response to the selection of a pivot data point according to one embodiment of the present invention. According to the embodiment FIG. 6 illustrates, a refined SRP 600 is presented to the user in response to the selection of the preferred content data source as the pivot data point 602. In this illustrated example, the preferred content source is a wiki-based content source, as determined by the tracking of user activities.

After the user selects the pivot data point 602 (labeled "Wikipedia"), the search results pane 604 is updated with results 606 only from the domain "http://en.wikipedia.org". Additionally, the updated SRP 600 provides a descriptive title bar 608 indicating that the user has pivoted into a refined search results page. Finally, the updated SRP 600 title bar 608 comprises a navigation control 610 that allows the user to return to the previous SRP 500 of FIG. 5.

Herein, the method and system, which may also be embodied on computer readable medium for execution by a processing device, provides for the advanced SRP accounting for preferred content sources. The determination of these sources is performed based on tracking of user activities, not burdening the user with any additional operations to achieve the search result optimization. The personal source searching therein further refines the searching operations for the user, as well as positioning the preferred content sources as a pivot data point for vertical searching operations specific to the selected content source.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for customized search results, the method comprising:
    tracking network activities of a user, the tracked network activities associated with a plurality of content types;
    determining from the tracked network activities, preferred content sources for each of the plurality of content types;
    receiving a search query from the user, the search query including a plurality of search terms;
    categorizing the search query according to a given query type;
    associating the search query with at least one of the plurality of content types based on the given query type;
    identifying one or more of the preferred content sources for the at least one of the plurality of content types associated with the search query;
    retrieving content items in response to the search query;
    selecting a subset of the one or more identified preferred content sources, the subset including preferred content sources having a number of the retrieved content items associated therewith greater than a threshold;
    filtering the content items based on the selected subset of the one or more preferred content sources; and
    generating a search result page displaying at least a portion of the filtered content items and an active data link associated with each of the subset of the identified preferred content sources, wherein selection of the active data link associated with a given content source allows the user to update the result page to include content items associated solely with a selected data link.

2. The method of claim 1, wherein tracking network activities is based on at least one of: a user click history, a bookmark database and web browser application toolbar data.

3. The method of claim 1 further comprising:
    identifying a non-public content source to which the user has access;
    performing the search operation on the non-public content source; and
    including the non-public content source in the plurality of preferred content sources.

4. The method of claim 3, wherein the search results display includes the display of the non-public content source.

5. The method of claim 3 further comprising:
    accessing user credentials for verification of access privilege to the non-public content source.

6. The method of claim 5 further comprising:
    receiving user-access instructions for accessing the non-public content source and instructions for utilizing the content from the non-public content source in the search results page.

7. The method of claim 3, wherein the non-public content is an online discussion group.

8. A system for customized search results, the system comprising:
    a memory device having executable instructions stored therein; and
    a processing device, in response to the executable instructions, configured to:
    track network activities of a user, the tracked network activities associated with a plurality of content types;

determine from the tracked network activities, preferred content sources for each of the plurality of content types;

receive a search query from the user, the search query including a plurality of search terms;

categorize the search query according to a given query type;

associate the search query with at least one of the plurality of content types based on the given query type;

identify one or more of the preferred content sources for the at least one of the plurality of content types associated with the search query;

retrieve content items in response to the search query;

select a subset of the one or more identified preferred content sources, the subset including preferred content sources having a number of the retrieved content items associated therewith greater than a threshold;

filter the content items based on the selected subset of the one or more preferred content sources; and generate a search result page displaying at least a portion of the filtered content items and an active data link associated with each of the subset of the identified preferred content sources, wherein selection of the active data link associated with a given content source allows the user to update the result page to include content items associated solely with a selected data link.

9. The system of claim 8, wherein tracking network activities is based on at least one of: a user click history, a bookmark database and web browser application toolbar data.

10. The system of claim 8, wherein the processing device is further configured to:

identify a non-public content source to which the user has access;

perform the search operation on the non-public content source; and include the non-public content source in the plurality of preferred content sources.

11. The system of claim 10, wherein the search results display includes the display of the non-public content source.

12. The system of claim 10, the processing device further configured to:

access user credentials for verification of access privilege to the non-public content source.

13. The system of claim 12, the processing device further configured to:

receive user-access instructions for accessing the non-public content source and instructions for utilizing the content from the non-public content source in the search results page.

14. The system of claim 10, wherein the non-public content is an online discussion group.

15. Non-transitory computer readable media comprising program code that when executed by a programmable processor causes execution of a method for customized search results, the method comprising:

computer program code for tracking network activities of a user, the tracked network activities associated with a plurality of content types;

computer program code for determining from the tracked network activities, preferred content sources for each of the plurality of content types;

computer program code for receiving a search query from the user, the search query including a plurality of search terms;

computer program code for categorizing the search query according to a given query type;

computer program code for associating the search query with at least one of the plurality of content types based on the given query type;

computer program code for identifying one or more of the preferred content sources for the at least one of the plurality of content types associated with the search query;

computer program code for retrieving content items in response to the search query;

computer program code for selecting a subset of the one or more identified preferred content sources, the subset including preferred content sources having a number of the retrieved content items associated therewith greater than a threshold;

computer program code for filtering the content items based on the selected subset of the one or more preferred content sources; and computer program code for generating a search result page displaying at least a portion of the filtered content items and an active data link associated with each of the subset of the identified preferred content sources, wherein selection of the active data link associated with a given content source allows the user to update the result page to include content items associated solely with a selected data link.

16. The computer readable media of claim 15, wherein tracking network activities is based on at least one of: a user click history, a bookmark database and web browser application toolbar data.

17. The computer readable media of claim 15 further comprising:

computer program code for identifying a non-public content source to which the user has access;

computer program code for performing the search operation on the non-public content source; and computer program code for including the non-public content source in the plurality of preferred content sources.

18. The computer readable media of claim 17, wherein the search results display includes the display of the non-public content source.

19. The computer readable media of claim 17 further comprising:

computer program code for accessing user credentials for verification of access privilege to the non-public content source; and receiving user-access instructions for accessing the non-public content source and instructions for utilizing the content from the non-public content source in the search results page.

20. The computer readable media of claim 17, wherein the non-public content is an online discussion group.

* * * * *